United States Patent [19]

Montini, Jr.

[11] Patent Number: 4,641,365
[45] Date of Patent: Feb. 3, 1987

[54] OVERPOWER PROTECTION FOR A RADIO FREQUENCY TRANSCEIVER

[75] Inventor: Charles Montini, Jr., Cherry Hill, N.J.

[73] Assignee: RCA Corporation, Princeton, N.J.

[21] Appl. No.: 643,418

[22] Filed: Aug. 23, 1984

[51] Int. Cl.⁴ ............................................. H04B 1/48
[52] U.S. Cl. ...................................... 455/78; 455/80; 455/82; 455/83; 455/217
[58] Field of Search ...................... 455/78, 80, 82, 83, 455/217, 73; 328/8; 370/32

[56] References Cited

U.S. PATENT DOCUMENTS

| | | | |
|---|---|---|---|
| 3,202,986 | 8/1965 | Cordry | 455/81 |
| 3,309,698 | 3/1967 | Baldock | |
| 4,158,814 | 6/1979 | Imazeki et al. | 455/217 |
| 4,361,819 | 11/1982 | Sillard et al. | 455/217 |
| 4,380,822 | 4/1983 | Broton | 455/80 |

FOREIGN PATENT DOCUMENTS 0032142 2/1982 Japan ................... 455/217

Primary Examiner—Jin F. Ng
Assistant Examiner—Elissa Seidenglanz
Attorney, Agent, or Firm—Joseph S. Tripoli; Robert L. Troike; Raymond E. Smiley

[57] ABSTRACT

A power limiter circuit for a radio frequency transceiver of the type having a single input-output antenna port is comprised of an isolator, first and second three port circulators and a pair of PIN diodes. One port of the first circulator is connected to the antenna port and one port of the second circulator is coupled to a transmit/receive antenna. The second ports of the two circulators are connected together through the isolator for passing signal from the transceiver to the antenna and the third ports of the two circulators are connected together for passing signal from the antenna to the transceiver. The PIN diodes, arranged in inverse parallel relationship, are connected between the third ports and circuit ground and operate in connunction with the isolator to limit to a safe value the signal passed from the antenna to the transceiver.

11 Claims, 1 Drawing Figure

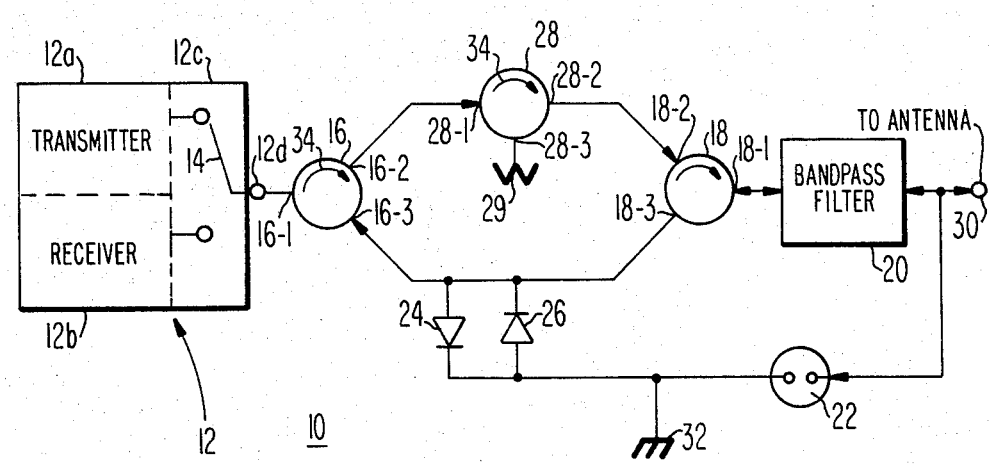

OVERPOWER PROTECTION FOR A RADIO FREQUENCY TRANSCEIVER

The Government has rights in this invention pursuant to Contract No. F19628-83-C-0069 awarded by the Department of the Air Force.

BACKGROUND OF THE INVENTION

1. Field of the Invention

This invention is concerned with preventing overpower damage to the receiver portion of a transceiver in the presence of an electromagnetic pulse (EMP) or lightning, and more particularly, to preventing damage in transceivers having a combined input/output antenna port.

2. Description of the Prior Art

Radio frequency transceivers utilizing a common transmit and receive antenna port may be damaged by an input signal which is at a high power level. If one attempts to provide power limiting means to prevent damage to the receiver portion of the transceiver, the same limiting would apply to the transmitter and thus the transmitter output power also would be undesirably reduced.

If the transceiver is of the type which has two output ports, one coupled to a transmitter antenna and one coupled to a receiver antenna, then it is possible to put a limiter in the receiver path. U.S. Pat. No. 3,309,698 issued on Mar. 14, 1967 to G. S. Baldock is an example of a radar having separate receiver and transmitter antenna connections marked Tx and Rx in the various figures and has limiters 12 and optionally $12^1$ in the receiver path. A solution such as disclosed in U.S. Pat. No. 3,309,698 is not possible in a transceiver having a combined receiver and transmitter antenna port.

SUMMARY OF THE INVENTION

The present invention is directed to a power limiter circuit for a radio frequency tranceiver of the type which has a receiver portion, a transmitter portion and a transmit/receive switch coupled to the receiver portion, the transmitter portion and an antenna port, comprising in combination first and second three port circulators, an isolator and a current limiter. A first port of the first circulator is adapted for coupling to the antenna port on the transceiver. A first port of the second circulator is adapted for coupling to an antenna means. A second port of each of the two circulators are coupled together to respective ports of the isolator to pass a signal which is input at the first circulator first port to the second circulator first port. A third port of each of the two circulators is coupled together to pass a signal which is input at the second circulator first port to the first circulator first port. The current limiter means is coupled to the third ports of the first and second three port circulators for limiting the power of signal passed from the second circulator to the first circulator.

BRIEF DESCRIPTION OF THE DRAWING

The sole FIGURE is a power limiter circuit in electrical schematic form for use with a radio frequency transceiver.

DETAILED DESCRIPTION OF A PREFERRED EMBODIMENT

Referring to the sole FIGURE, power limiter circuit 10 constructed in accordance with the invention is coupled to a radio frequency transceiver 12 of conventonal design. Specifically, the transceiver is of the type having a transmitter portion 12a, a receiver portion 12b and a transmit/receive switch 12c connected to an antenna port 12d. Switch 12c may be connected to pass signals between either the transmitter 12a and antenna port 12d or between antenna port 12d and receiver 12b depending on the position of switch arm 14. It will be understood that, in a typical transceiver, transmit/receive switch 12c is not a mechanical switch as shown but typically is a switch constructed of solid state components.

Power limiter 10 comprises first and second three port circulators 16 and 18 and power limiting means comprising bandpass filter 20, a gas tube surge protector 22, PIN diodes 24 and 26 connected in an inverse parallel arrangement and an isolator 28.

Arrows in elements 16, 18 and 28 such as arrow 34 indicate the intended direction of signal flow. Thus, for example, signal input at port 16-1 of circulator 16 exits at port 16-2. Signal input at port 16-3 exits at port 16-1. Isolator 28 is identical in consturction to the two circulators 16 and 18. The purpose of isolator 28 is to pass signal input at port 28-1 to port 28-2 and pass any signal input at port 28-2 to port 28-3 where it is dissipated by resistive load 29.

Circulators 16 and 18 and isolator 28 have a limited operating frequency band (15% or less of the operating frequency). Bandpass filter 20 serves to limit the frequency spectrum of the undesired energy reaching circulators 16 and 18 and isolator 28 to the operating band of these components. An exemplary filter 20 has a bandpass from 300 megahertz to 350 megahertz with out-of-band rejection of 60 dB out to 1 gigahertz.

Most of the EMP or lightning energy of the antenna line is absorbed by gas tube 22. Gas tubes are designed primarily for lightning protection. Gas tube 22 is specified to fire at a voltage higher than the maximum transmit voltage. Gas tube 22 is located on the antenna side of the filter to protect the filter from high voltage damage. The shunt capacity of the gas tube must be low enough to prevent degrading of the desired transmit and receive signal. An examplary gas tube is one manufactured by Joslyn Electronic Systems, Galelo, Calif., as part number 2021-10 designed to fire at 145 V and rated for 5,000 amperes.

First port 16-1 of circulator 16 is connected to antenna port 12d of transceiver 12. A first port 18-1 of circulator 18 is connected to bandpass filter 20 which is connected to an antenna terminal 30. Terminal 30 is connected to a transmit/receive antenna (not shown) of conventional design. The second port 16-2 of circulator 16 is connected to port 28-1 of isolator 28. Second port 28-2 of isolator 28 is connected to port 18-2 of circulator 18 while the third port 28-3 is terminated in its characteristic impedance of 50 ohms by resistive load 29. Third port 18-3 of circulator 18 is coupled to the third port 16-3 of circulator 16. The output of bandpass filter 20 is coupled to an input of a gas tube surge protector 22. The output of surge protector 22 is connected to earth ground by the least resistive path possible. A limiter comprising inverse parallel PIN diodes 24 and 26 is connected between a path connecting port 18-3 and port 16-3 of circulators 18 and 16 and circuit ground.

Operation of the circuit is as follows. When transmission is desired, switch 12c is positioned as illustrated with transmitter portion 12a coupled to antenna port 12d. The signal produced by transmitter 12a is then passed into port 16-1 of circulator 16, out from port 16-2 into port 28-1 of isolator 28, out of port 28-2 to input at port 18-2 of circulator 18 and out of port 18-1 through bandpass filter 20 to antenna port 30 and thence to a transmit/receive antenna (not shown).

A normal low-level signal input to antenna port 30 passes through bandpass filter 20 into port 18-1 of circulator 18 out port 18-3 to input at port 16-3 at circulator 16 and out port 16-1 to terminal 12d of transceiver 12. If at that time switch arm 14 is positioned connecting port 12d to receiver portion 12b, the low-level input signal is received by receiver 12b and processed appropriately. If an excessively high power signal is received at antenna 13, limiter 10 contains a number of elements designed to prevent that excess signal from reaching receiver 12b. When the incoming pulse level at antenna terminal 30 exceeds the breakdown voltage level of gas tube 22, the tube becomes ionized pulling down the voltage level at bandpass filter 20 the breakdown voltage level of tube 22. However, if the pulse has a very rapid rise time (as with an EMP pulse) several thousand volts may get through before the gas tube can react. Energy passing the gas tube is further reduced by bandpass filter 20. The only energy passing through the filter is in the operating band of circulators 16 and 18 and is routed from port 18-1 to port 18-3 to the diode limiter. The high power causes the diodes to conduct creating a mismatch on the line joining ports 18-3 and 16-3. The mismatch causes most of the energy to be reflected back through port 18-3 to port 18-2 and to isolator port 28-2 to the termination load 29 on port 28-3.

When the diode limiter conducts, it also causes a mismatch at port 16-3 of circulator 16 defeating its isolation characteristics. Therefore, the only isolation in the circuit is provided by isolator 28 (in the order of 20 to 25 dB). The isolation can be doubled by placing another isolator between ports 16-2 and 28-1 or between port 16-3 and diode 24. However, an isolator located between ports 16-2 and 28-1 will provide additional insertion loss to the transmit signal and reduce the transmit power delivered to the antenna. This may not be acceptable. An isolator identical to isolator 28 with a termination load identical to load 29 in the line located between port 16-3 and diode 24 will keep port 16-3 properly terminated and allow circulator 16 to retain its isolation characteristics when the diode limiter conducts. This isolator does not reduce transmitted power and has the additional advantage of further isolating the diode limiter from transmit power leakage through circulator 16.

Thus with limiter 10, the amount of energy reaching receiver 12b with a high level EMP pulse or lightening pulse, for example, on the antenna line can be reduced to approximately 10 milliwatts.

What is claimed is:

1. A power limiter circuit for a radio frequency transceiver of the type which has a receiver portion, a transmitter portion and a transmit/receive switch coupled to the receiver portion, the transmitter portion and an antenna port, said power limiter comprising in combination:
    a three port isolator;
    first and second three port circulators, a first port of said first circulator being adapted for coupling to said antenna port on said transceiver, a first port of said second circulator being adapted for coupling to an antenna means, a second port of each of said two circulators being coupled to first and second ports respectively of said isolator to pass signal input at said first circulator first port to said second circulator first port, a third port of each of said two circulators being coupled together to pass a signal input at said second circulator first port to said first circulator first port; and
    means for limiting the power received at said receiver portion of a signal input at said second circulator first port, said means comprising means coupled between the connection joining said third ports of said first and second circulators and circuit ground.

2. The combination as set forth in claim 1 wherein said means for limiting the power comprises at least one PIN diode coupled between the connection joining said third ports of said first and second circulators and circuit ground.

3. The combination as set forth in claim 2 further including a bandpass filter connected between said first port of said second circulator and a terminal to which said antenna means may be connected.

4. The combination as set forth in claim 3 further including power limiting means connected between said bandpass filter terminal and system ground for passing to ground any signal at said bandpass filter terminal in excess of a preselected voltage value which value is above the level of transmitted signal from said transmitter portion.

5. The combination as set forth in claim 1 wherein said means for limiting the power comprises a pair of PIN diodes in inverse parallel relationship coupled between the connection joining said third ports of said first and second circulators and circuit ground.

6. The combination as set forth in claim 5 further including a bandpass filter connected between said first port of said second circulator and a terminal to which said antenna means may be connected.

7. The combination as set forth in claim 6 further including power limiting means connected between said bandpass filter terminal and system ground for passing to ground any signal at said bandpass filter terminal in excess of a preselected value which value is above the level of transmitted signal from said transmitter portion.

8. The combination as set forth in claim 1 wherein the third port of said isolator is terminated in its characteristic impedance and wherein said means for limiting the power comprises at least one PIN diode coupled between the connection joining said third ports of said first and second circulators and circuit ground for causing a mismatch on said connection for causing power on said connection to be reflected back to said second circulator third port, thence to said second circulator second port, thence to said isolator to be dissipated by said characteristic impedance.

9. The combination as set forth in claim 1 wherein the third port of said isolator is terminated in its characteristic impedance and wherein said means for limiting the power comprises a pair of PIN diodes in inverse parallel relationship coupled between the connection joining said third ports of said first and second circulators and circuit ground for causing a mismatch on said connection for causing power on said connection to be reflected back to said second circulator third port, thence to said second circulator second port, thence to said isolator to be dissipated by said characteristic impedance.

10. The combination as set forth in claim 1 further including a bandpass filter connected between said first port of said second circulator and a terminal to which said antenna means may be connected.

11. The combination as set forth in claim 10 further including power limiting means connected between said bandpass filter terminal and system ground for passing to ground any signal at said bandpass filter terminal in excess of a preselected voltage value which value is above the level of transmitted signal from said transmitter portion.

* * * * *